United States Patent
Yasoshina et al.

(10) Patent No.: US 11,421,634 B2
(45) Date of Patent: Aug. 23, 2022

(54) INTERNAL COMBUSTION ENGINE

(71) Applicant: HONDA MOTOR CO., LTD., Tokyo (JP)

(72) Inventors: Sayaka Yasoshina, Saitama (JP); Manabu Hashimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/527,325

(22) Filed: Nov. 16, 2021

(65) Prior Publication Data
US 2022/0074376 A1 Mar. 10, 2022

Related U.S. Application Data

(63) Continuation of application No. PCT/JP2019/024543, filed on Jun. 20, 2019.

(51) Int. Cl.
*F02B 3/00* (2006.01)
*F02M 37/00* (2006.01)
(Continued)

(52) U.S. Cl.
CPC ......... *F02M 37/0047* (2013.01); *F02B 75/22* (2013.01); *F02M 37/32* (2019.01); *F02M 55/02* (2013.01); *F02M 2200/85* (2013.01)

(58) Field of Classification Search
CPC .... F02M 37/0047; F02M 37/32; F02M 55/02; F02M 2200/85; F02B 75/22
(Continued)

(56) References Cited

U.S. PATENT DOCUMENTS 4,915,063 A * 4/1990 Stumpf ................. F02M 17/04
 123/41.31
6,006,729 A * 12/1999 Aoyama ................. F01P 5/02
 123/468
(Continued)

FOREIGN PATENT DOCUMENTS

JP 9-264225 A 10/1997
JP 11-37011 A 2/1999
(Continued)

OTHER PUBLICATIONS

International Search Report dated Sep. 10, 2019, issued in counterpart International Application No. PCT/JP2019/024543 (2 pages).

*Primary Examiner* — Hung Q Nguyen
*Assistant Examiner* — Anthony Donald Taylor, Jr.
(74) *Attorney, Agent, or Firm* — WHDA, LLP

(57) ABSTRACT

An internal combustion engine that includes a first fuel pump that sucks fuel through a fuel filter, and a second fuel pump that supplies the fuel to a fuel injection device. The internal combustion engine comprises: a first fuel pipe that interconnects the fuel filter, the first fuel pump, and the second fuel pump set to have a pressure higher than a pressure of the first fuel pump; and a second fuel pipe that connects the second fuel pump to the fuel injection device that injects fuel into a combustion chamber formed in a cylinder portion of the internal combustion engine, a shielding wall covering an outside of the cylinder portion is provided between at least a part of the second fuel pipe and the cylinder portion, and the shielding wall includes a holding portion that holds at least the first fuel pipe and the second fuel pipe.

10 Claims, 14 Drawing Sheets

(51) Int. Cl.
  *F02M 37/32*     (2019.01)
  *F02B 75/22*     (2006.01)
  *F02M 55/02*     (2006.01)
(58) Field of Classification Search
  USPC ......................................................... 123/294
  See application file for complete search history.

(56) References Cited

U.S. PATENT DOCUMENTS

| | | | |
|---|---|---|---|
| 7,441,548 B1* | 10/2008 | Onishi | F02M 37/20 |
| | | | 123/469 |
| 9,764,697 B1* | 9/2017 | Kobayashi | B60R 13/0861 |
| 2012/0048872 A1* | 3/2012 | Kobayashi | F02M 25/06 |
| | | | 220/745 |
| 2015/0198087 A1* | 7/2015 | Tachibana | B60R 13/0838 |
| | | | 60/323 |

FOREIGN PATENT DOCUMENTS

| | | | | |
|---|---|---|---|---|
| JP | 2000-329021 A | 11/2000 | | |
| JP | 2000329021 A | * 11/2000 | ............ | Y02T 10/12 |
| JP | 2007-177683 A | 7/2007 | | |
| JP | 2008-255868 A | 10/2008 | | |
| JP | 2015-232310 A | 12/2015 | | |

* cited by examiner

INTERNAL COMBUSTION ENGINE

CROSS-REFERENCE TO RELATED APPLICATIONS

This application is a continuation of International Patent Application No. PCT/JP2019/024543 filed on Jun. 20, 2019, the entire disclosures of which is incorporated herein by reference.

BACKGROUND OF THE INVENTION

Field of the Invention

The present invention relates to an internal combustion engine.

Description of the Related Art

PTL 1 discloses a fuel supply device including a low-pressure fuel pump that supplies fuel from a fuel tank provided outside of a casing of an engine to a volumetric chamber provided in the casing, and a high-pressure fuel pump that supplies the fuel in the volumetric chamber to a high-pressure passage in the casing connected to a fuel injection unit.

CITATION LIST

Patent Literature

PTL 1: Japanese Patent Laid-Open No. 2008-255868

SUMMARY OF THE INVENTION

Technical Problem

However, in the configuration of PTL 1, when the high-pressure passage connected to the fuel injection unit is heated by heat received from the engine, air bubbles (vapor) generated by vaporization of the fuel in the high-pressure passage may cause a phenomenon in which it is difficult to supply the fuel to the fuel injection unit (vapor lock).

In view of the problem described above, an object of the present invention is to provide an internal combustion engine capable of reducing the vaporization of fuel in a high-pressure passage and suppressing the occurrence of a vapor lock phenomenon.

Solution to Problem

According to an aspect of the present invention, there is provided an internal combustion engine that includes a first fuel pump that sucks fuel through a fuel filter, and a second fuel pump that supplies the fuel to a fuel injection device, the internal combustion engine comprising: a first fuel pipe that interconnects the fuel filter, the first fuel pump, and the second fuel pump set to have a pressure higher than a pressure of the first fuel pump; and a second fuel pipe that connects the second fuel pump to the fuel injection device that injects fuel into a combustion chamber formed in a cylinder portion of the internal combustion engine, wherein a shielding wall covering an outside of the cylinder portion is provided between at least a part of the second fuel pipe and the cylinder portion and the shielding wall includes a holding portion that holds at least the first fuel pipe and the second fuel pipe.

Advantageous Effects of Invention

According to the present invention, since the second fuel pipe connected to the fuel injection device is separated from the cylinder portion and shielded from heat by the shielding wall, it is possible to reduce the heat transferred from the cylinder portion with respect to the second fuel pipe. Accordingly, it is possible to provide an internal combustion engine capable of reducing fuel vaporization and suppressing the occurrence of vapor lock.

Other features and advantages of the present invention will be apparent from the fallowing description taken in conjunction with the accompanying drawings. Note that the same reference numerals denote the same or like components throughout the accompanying drawings.

DESCRIPTION OF EMBODIMENTS

Hereinafter, embodiments of the present invention will be described with reference to the drawings. The components described in these embodiments are merely examples and are not limited by the following embodiments.

First Embodiment

Figure 1:
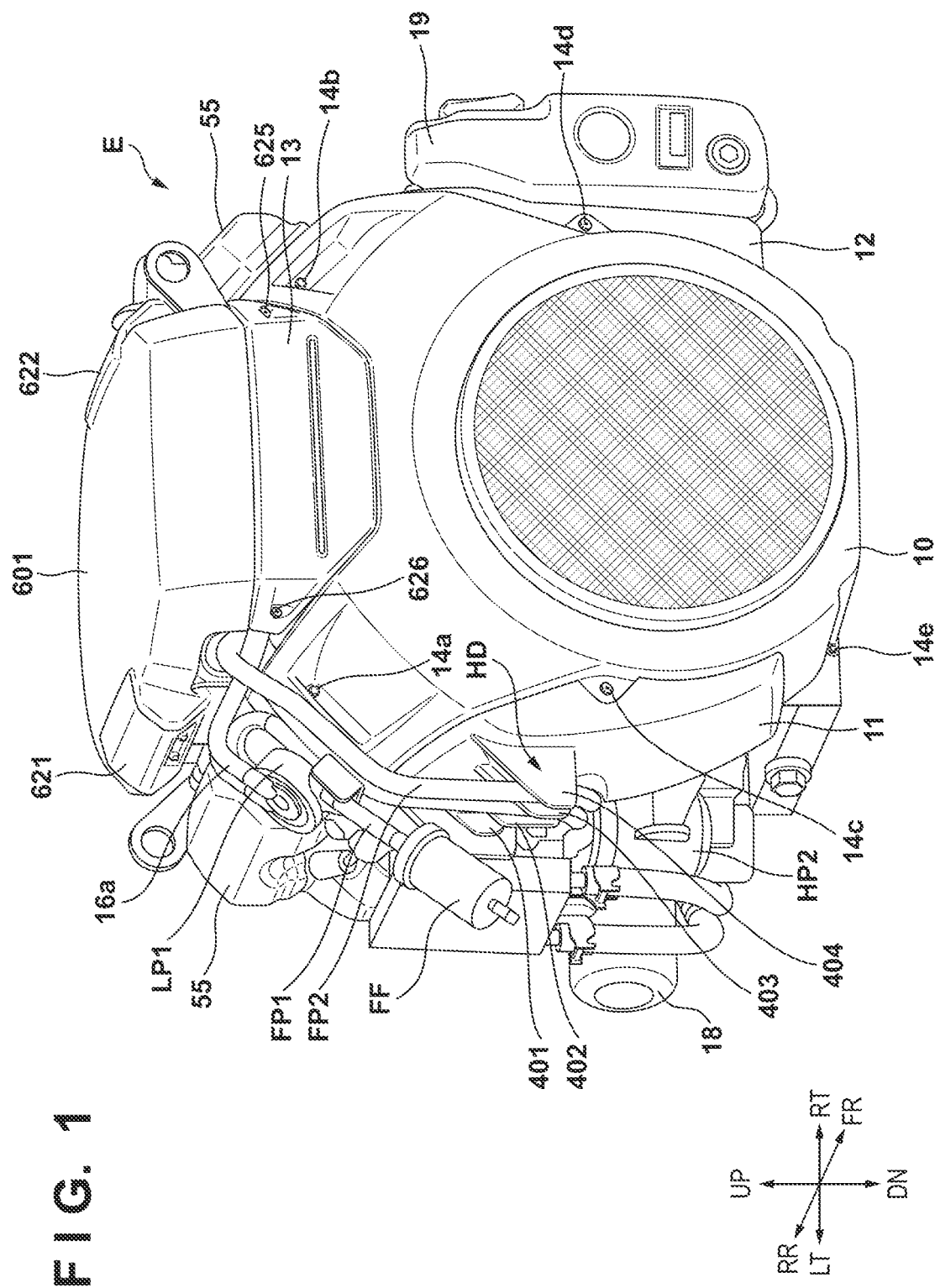
FIG. 1 is a front perspective view of an internal combustion engine according to a first embodiment.
Figure 2:
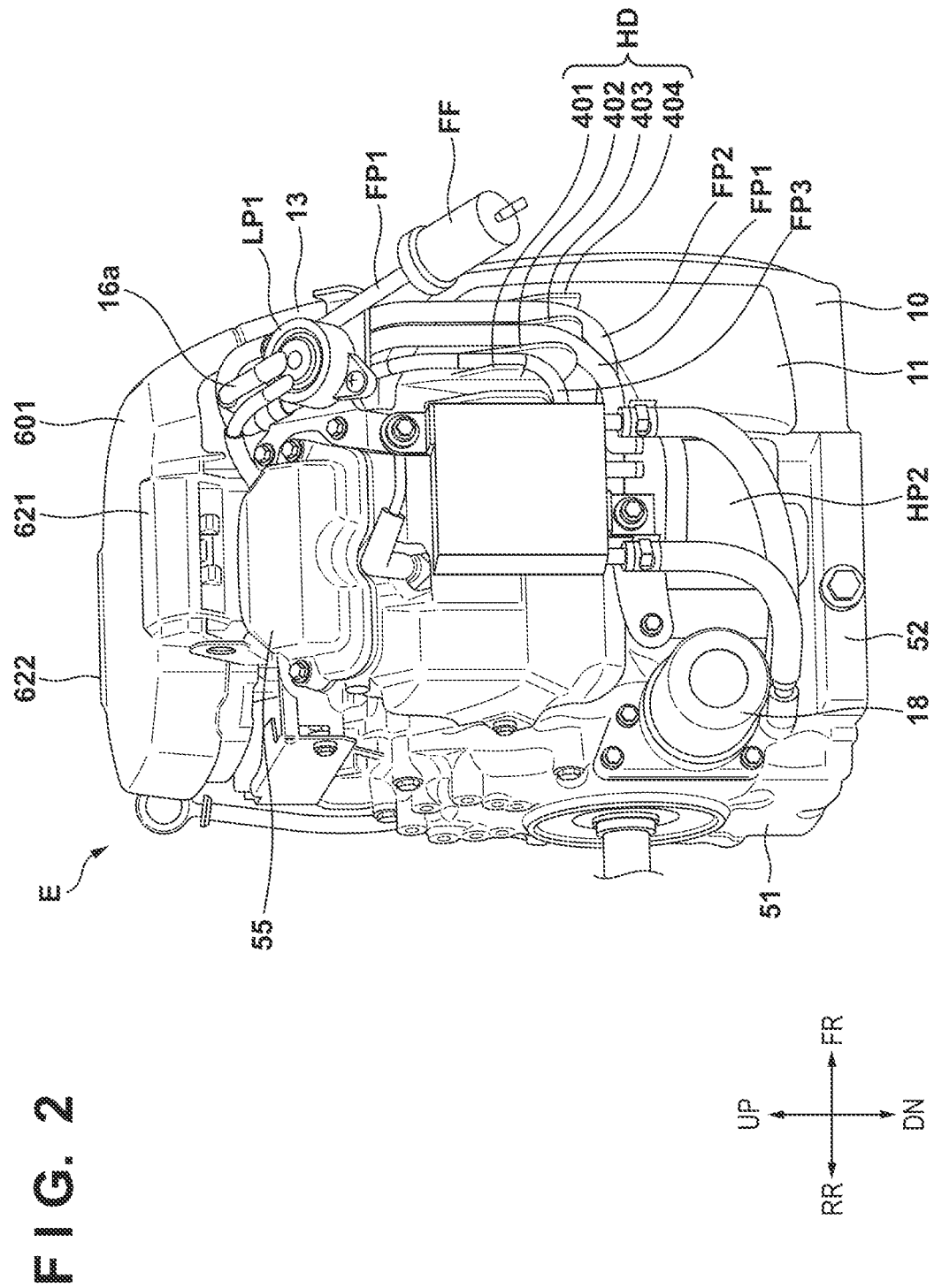
FIG. 2 is a left side perspective view of the internal combustion engine according to the first embodiment.
Figure 3:
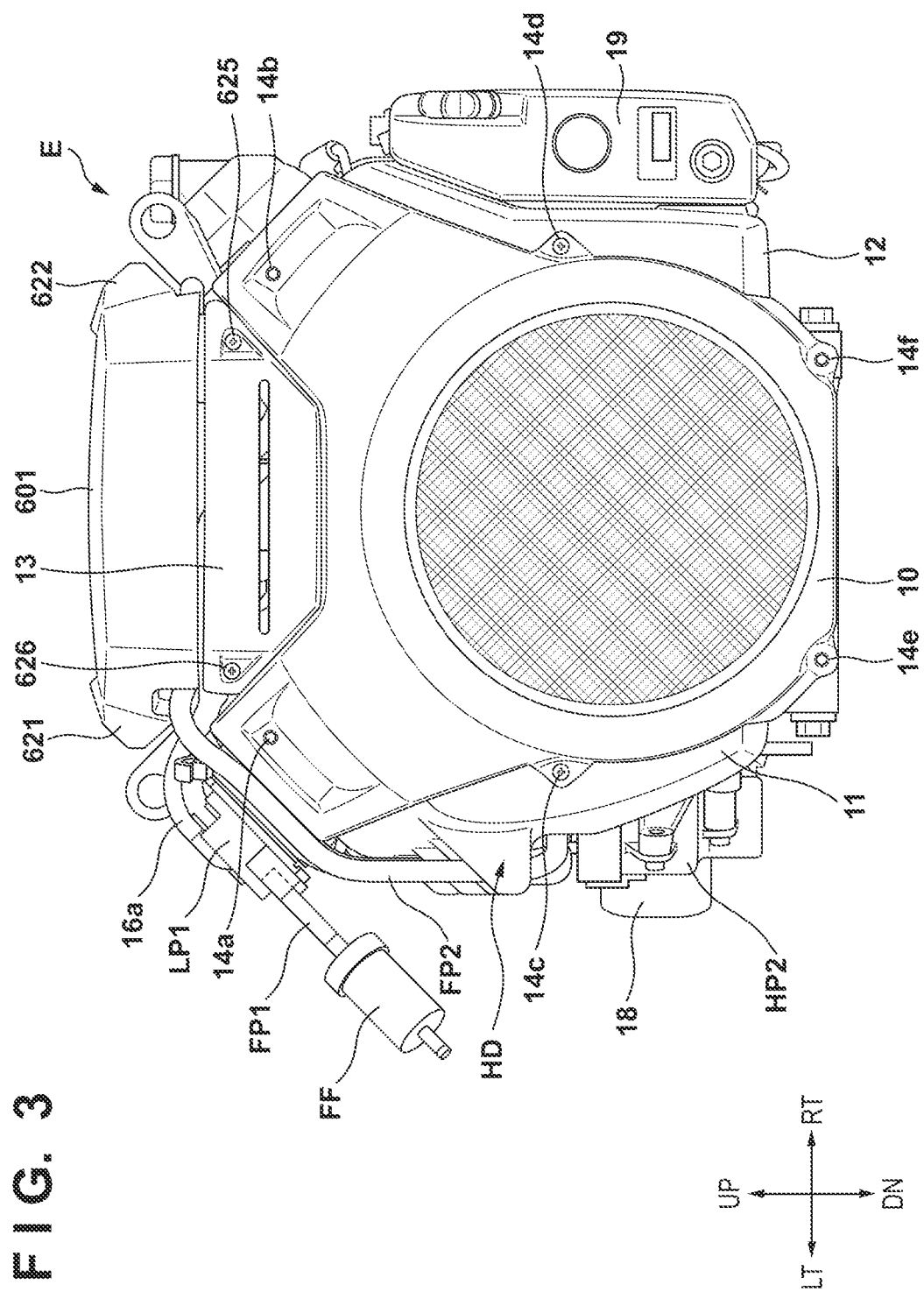
FIG. 3 is a front view of the internal combustion engine according to the first embodiment.
Figure 4:
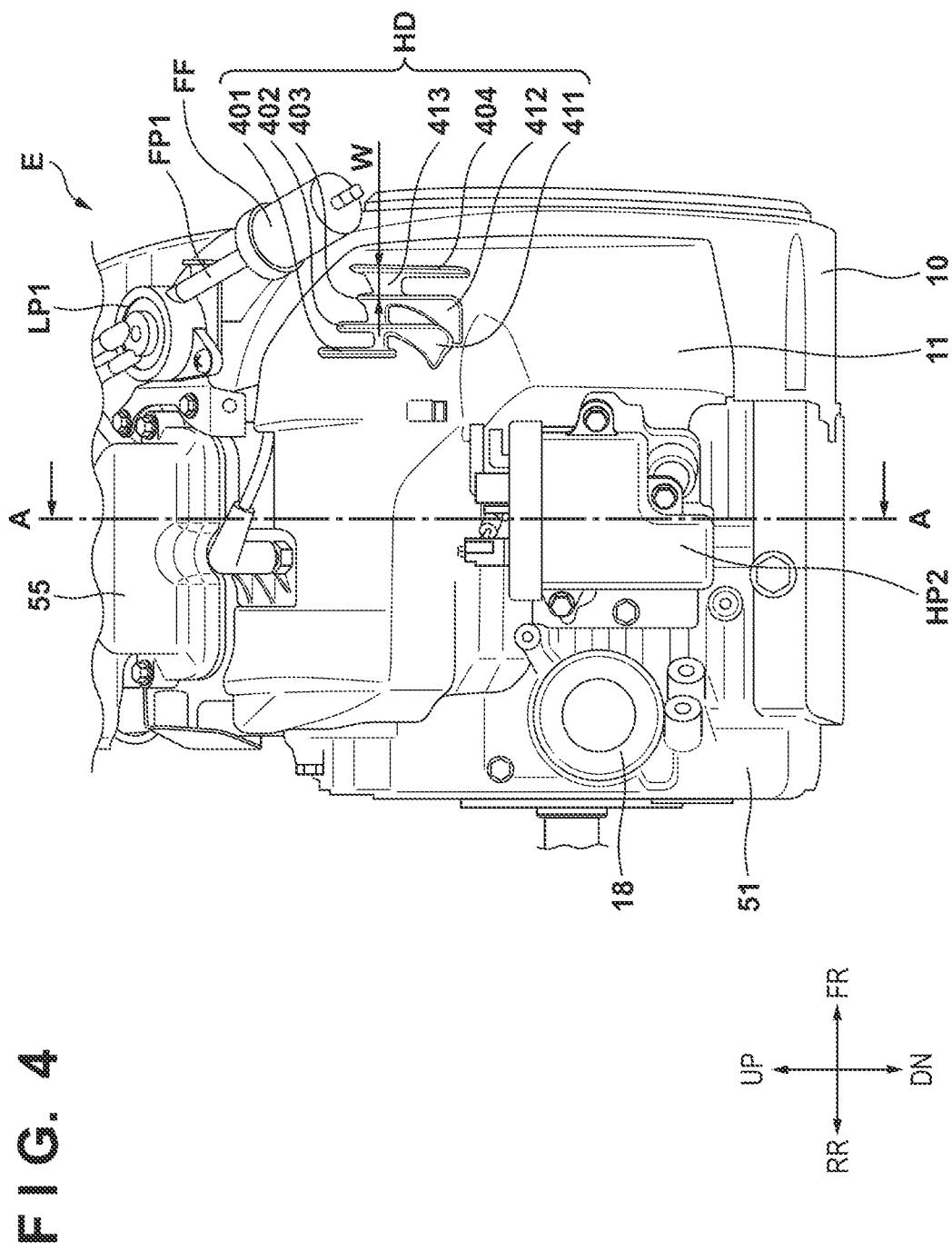
FIG. 4 is a left side view of the internal combustion engine according to the first embodiment.
Figure 5:
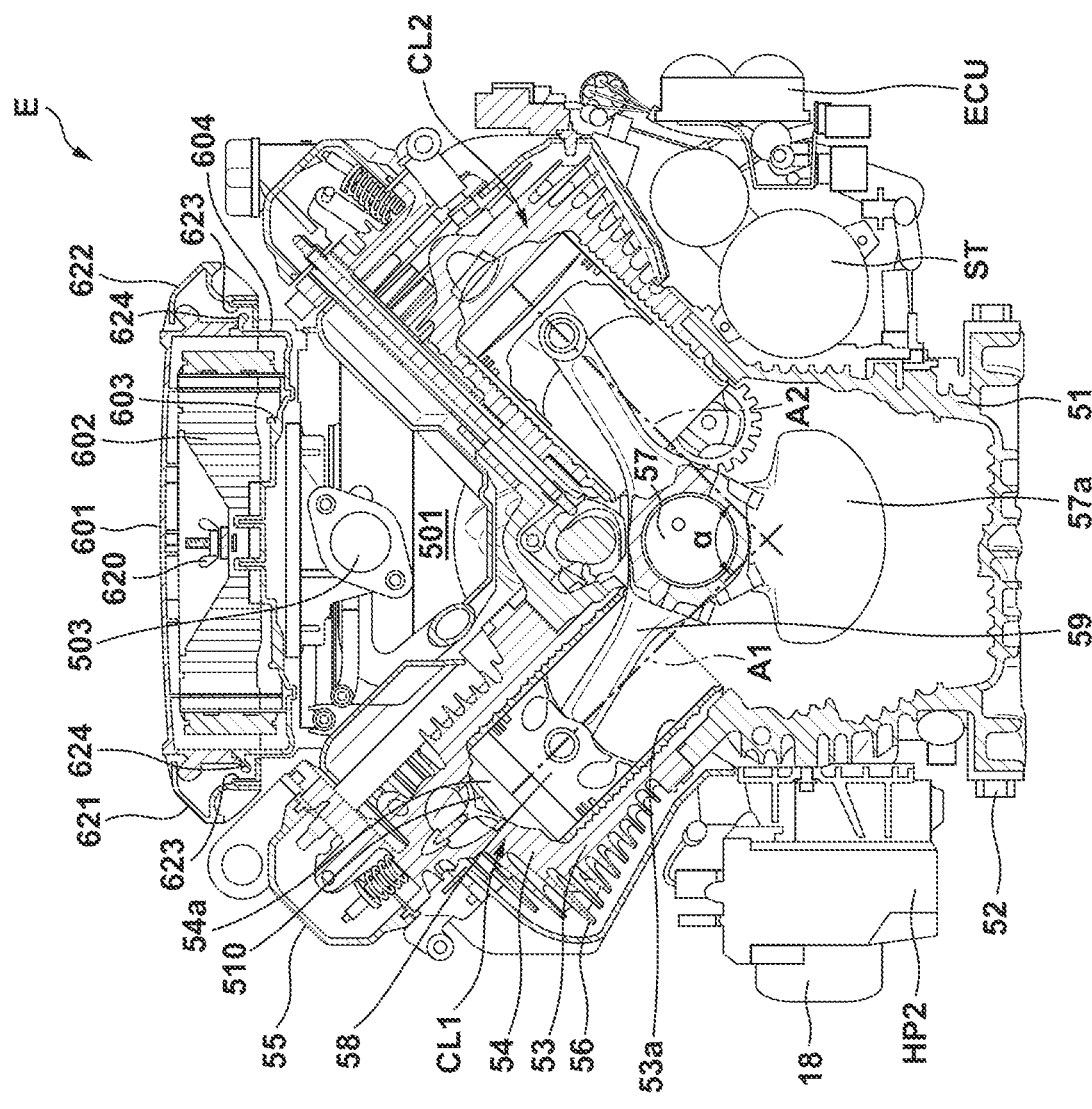
FIG. 5 is a cross-sectional view of the internal combustion engine taken along line AA of FIG. 4 in a front direction.

FIG. 1 is a front perspective view of an internal combustion engine according to a first embodiment, and FIG. 2 is a left side perspective view of the internal combustion engine. FIGS. 3 and 4 are a front view and a left side view of the internal combustion engine, and FIG. 5 is a cross-sectional view of the internal combustion engine in a front direction in an arrow view of a cross-section taken along line AA of FIG. 4. In addition, as directions in the drawings used for the following description, arrow FR indicating the front and arrow RR indicating the rear of the internal combustion engine, arrow LT indicating the left direction and arrow RT indicating the right direction of the internal combustion engine, and arrow UP indicating the upper side and arrow DN indicating the lower side of the internal combustion engine are illustrated.

Basic Configuration of Internal Combustion Engine E

As illustrated in FIG. 5, an internal combustion engine E is an air-cooled engine (V-type engine) in which a plurality of cylinders (CL1, CL2) is arranged in a substantially V-shape at a predetermined bank angle α. A first cylinder CL1 and a second cylinder CL2 are arranged such that the opening angle α, that is, the angle α formed by cylinder center line A1 of the first cylinder CL1 and cylinder center line A2 of the second cylinder CL2 is a predetermined angle (for example, approximately 90°). In an upper portion of a crankcase 51, the first cylinder CL1 and the second cylinder CL2 arranged in a V shape in the lateral direction in a sheet plane of the drawing are provided. A flange 52 for installing the internal combustion engine E is formed on a bottom portion of the crankcase 51. In addition, a high-pressure fuel pump HP2 is provided below the first cylinder CL1 on the left side of the sheet plane of the internal combustion engine E, and a starting device ST for starting the internal combustion engine E and a control device ECU electrically connected to an operation unit 19 are provided below the second cylinder CL2 on the right side of the sheet plane of the internal combustion engine E.

Each of the first cylinder CL1 and the second cylinder CL2 includes a cylinder block 53 in which a cylinder bore 53a is formed, a cylinder head 54 in which a combustion chamber 54a connected to the cylinder bore 53a, is formed and integrally connected to the cylinder block 53, and a head cover 55 coupled to an upper portion of the cylinder head 54. A large number of air-cooling fins 56 are formed on the outer surfaces of the cylinder block 53 and the cylinder head 54. In addition, each of the first cylinder CL1 and the second cylinder CL2 is provided with an intake valve 510 and an exhaust valve (not illustrated in the drawings), and in a state where the intake valve 510 is opened, an air-fuel mixture of fuel injected from a fuel injection device INJ (FIGS. 7 and 8) and air to be sucked is sent into the combustion chamber 54a.

One crankshaft 57 is supported by front and rear end walls of the crankcase 51 (both wall portions of the crankcase 51 in the direction perpendicular to the sheet plane), and a piston 58 fitted in the cylinder bores 53a of the first cylinder CL1 and the second cylinder CL2 is connected to the crankshaft 57 via a connecting rod 59. The crankshaft 57 is provided with a counterweight 57a that is balanced with the inertial force of pistons 58 of the first cylinder CL1 and the second cylinder CL2. An air cleaner C incorporating an air cleaner element 602 is arranged above a valley portion 501 formed between the first cylinder CL1 and the second cylinder CL2, and an air supply pipe 503 for supplying air filtered by the air cleaner element 602 to the internal combustion engine E is provided on the lower surface side of the air cleaner AC.

Routing Structure of Internal Combustion Engine E

As illustrated in FIGS. 1 to 4, the internal combustion engine E is provided with a front shroud 10, a left lower shroud 11, and a right lower shroud 12 as engine covers (hereinafter, referred to as a "shielding wall") that cover at least the outside of the cylinder portions (the first cylinder CL1 and the second cylinder CL2). The front shroud 10, the left lower shroud 11, and the right lower shroud 12 are attached to the cylinder block 53 by being fastened with fastening members 14 (14a to 14f) such as bolts, screws, or the like, and the upper shroud 13 is attached to an upper portion of the front shroud 10 by fastening members 625 and 626 such as bolts, screws, or the like.

A fuel filter FF can be attached to a fuel tank (not illustrated in the drawings) in an external work device, for example, a work device such as a cultivator, a pump device (water pump), a high-pressure washing machine, a spraying device (sprayer) for spraying a chemical or the like, and a ground compacting device compactor), and the like, and can filter foreign substances in the fuel stored in the fuel tank of the work device.

A first fuel pump LP1 (low-pressure fuel pump) supplies fuel introduced through the fuel filter FF to a second fuel pump HP2 (high-pressure fuel pump) at a first supply pressure (P1). The first fuel pump LP1 is constituted by, for example, a mechanical pump (diaphragm pump), pressure fluctuation of the cylinder portions (the first cylinder CL1 and the second cylinder CL2) caused by vertical movement of the piston 58 in the internal combustion engine E is transmitted to the first fuel pump LP1 via the diaphragm tube 16a (FIGS. 1 and 2), and the first fuel pump LP1 is driven based on the transmitted pulse of the pressure fluctuation.

In addition, the second fuel pump HP2 (high-pressure fuel pump) is an electric pump, and the operation thereof is controlled by the control device ECU (FIG. 5). The second fuel pump HP2 supplies (pressurizing feeds) the fuel supplied from the first fuel pump LP1 to the fuel injection device INJ at a second supply pressure (P2). Here, in the relationship between the fuel supply pressures in the first fuel pump LP1 and the second fuel pump HP2, the pressure set in the second fuel pump HP2 (second supply pressure (P2)) is higher than the pressure set in the first fuel pump LP1 (first supply pressure (P1)) (P2>P1). The fuel injection device INJ injects the fuel supplied from the second fuel pump HP2 into the combustion chamber 54a formed in the cylinder portion (CL1, CL2).

The first fuel pipe FP1 (low-pressure fuel pipe) interconnects the fuel filter FF, the first fuel pump LP1 (low-pressure fuel pump), and the second fuel pump HP2 (high-pressure fuel pump) set to have a pressure higher than the pressure of the first fuel pump LP1.

The second fuel pipe FP2 (high-pressure fuel pipe) connects the second fuel pump HP2 (high-pressure fuel pump) to the fuel injection device INJ that injects fuel into the combustion chamber 54a formed in the cylinder portion (CL1, CL2) provided in the internal combustion engine E. As illustrated in FIGS. 1 to 4, shielding walls (members covering the outside of the cylinder portion (CL1, CL2): 10, 11, and 12 in FIG. 1) are provided between at least a part of the second fuel pipe FP2 (high-pressure fuel pipe) and cylinder portion (CL1, CL2) provided in the internal combustion engine E.

The third fuel pipe FP3 connects an air cleaner AC that filters air to be supplied to the internal combustion engine to the second fuel pump HP2 (high-pressure fuel pump). Air bubbles (vapor) generated by fuel vaporization in the second fuel pump HP2 (high-pressure fuel pump) are pressurizing fed from the second fuel pump HP2 to the air cleaner AC by the third fuel pipe FP3. Air bubbles (vapor) generated by fuel vaporization in the second fuel pump HP2 (high-pressure fuel pump) are previously pressurizing fed to the air cleaner AC by the third fuel pipe FP3, so that air bubbles (vapor) that can be mixed in the fuel supplied by the second fuel pipe FP2 (high-pressure fuel pipe) can be reduced.

In addition, air bubbles (vapor) generated by Biel vaporization are returned to the combustion chamber 54a for combustion in the internal combustion engine E without being released into the atmosphere, so that it is possible to provide the internal combustion engine E conforming to environmental regulations.

Cross-Sectional Structure of Second Fuel Pipe FP2 (High-Pressure Fuel Pipe)

Figure 10:
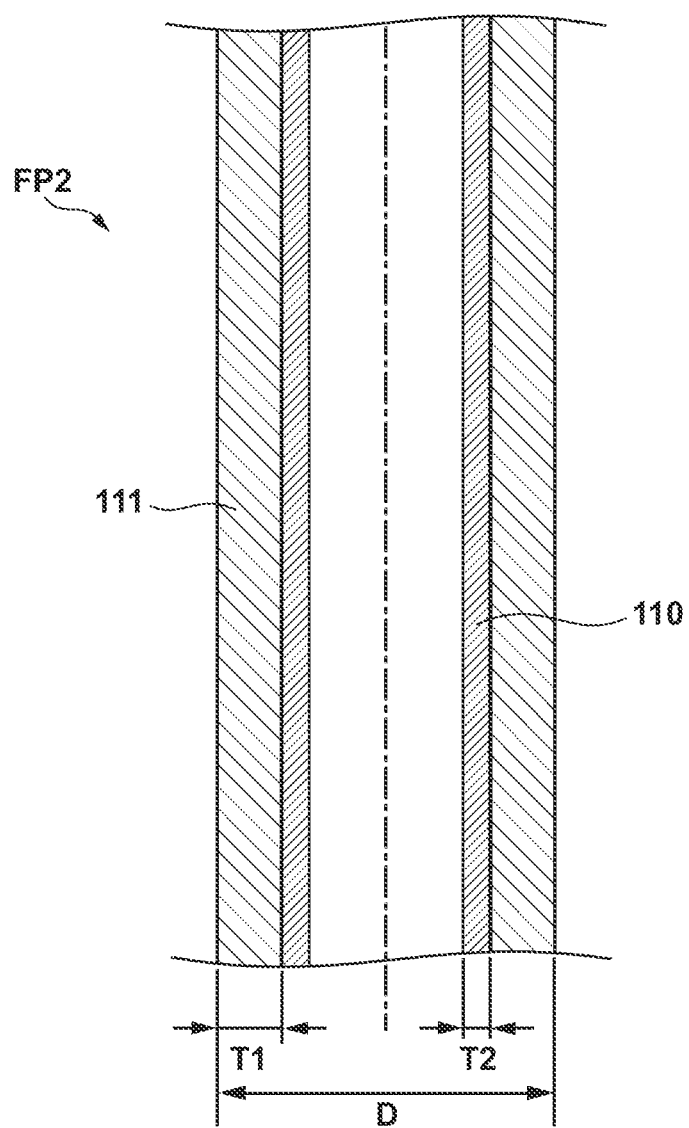
FIG. 10 is a diagram illustrating a cross-sectional structure of the high-pressure fuel pipe.

FIG. 10 is an enlarged view of a cross-sectional structure of the second fuel pipe FP2 (high-pressure fuel pipe). As illustrated in FIG. 10, the second fuel pipe FP2 (high-pressure fuel pipe) has a multiple-pipe structure including at least an inner tubular member 110 and an outer tubular member 111 covering an outer side of the inner tabular member 110, and the outer tubular member 111 is formed of a member that an elastic coefficient (E1) of the outer tubular member 111 is smaller than an elastic coefficient (E2) of the inner tubular member 110 (E1<E2).

The member thickness (T1) of the outer tubular member 111 is formed thicker than the member thickness (T2) of the inner tubular member 110 (T1>T2), and even in a case where an external factor acts, it is possible to protect the inner fibular member 110 by the covering of the outer tabular member 111. Since the second fuel pipe FP2 has the multiple-pipe structure as illustrated in FIG. 10, it is possible to enhance the strength and durability of the second fuel pipe FP2 and suppress the influence associated with external factors. Note that it is possible to connect various joints to an end portion 112 of the second fuel pipe FP2.

Structure of Holding Portion

As illustrated in FIGS. 1 to 4, the shielding wall is provided with a holding portion HD that holds at least the first fuel pipe FP1 (low-pressure fuel pipe) and the second fuel pipe FP2 (high-pressure fuel pipe). The shielding wall is an engine cover (for example, the left lower shroud 11) that covers at least the cylinder portion (CL1, CL2), and the holding portion HD is provided integrally with the engine cover.

The holding portion HD includes side holding portions (a plurality of ribs 401 to 404) that hold sides of a plurality of fuel pipes (first fuel pipe FP1, second fuel pipe FP2, and third fuel pipe FP3), and outer peripheral holding portions 411 to 413 that holds outer peripheral surfaces of the plurality of fuel pipes in a state of being separated from the shielding wall. Here, the outer peripheral holding portions 411 and 412 are provided directed toward the second fuel pump side. Note that the configuration of the outer peripheral holding portions 411 to 413 is similarly formed in a plurality of ribs 1101 to 1105 in FIGS. 11 and 13 of the second embodiment, and it is possible to provide similar effects in the routing structure in the plurality of fuel pipes.

The holding portion HD includes a plurality of ribs 401 to 404 protruding outward the shielding wall. Among the plurality of the ribs 401 to 404, the rib 401 and rib 402 serve as a pair of side support portions and hold the third fuel pipe FP3. In addition, the ribs 402 and 403 serve as a pair of side support portions and hold the first fuel pipe FP1, and the ribs 403 and 404 serve as a pair of side support portions and hold the second fuel pipe FP2. At least one or more ribs (rib 403) of the plurality of ribs 401 to 404 hold both the first fuel pipe FP1 (low-pressure fuel pipe) and the second fuel pipe FP2 (high-pressure fuel pipe). In addition, at least one or more ribs (rib 402) of the plurality of ribs 401 to 404 hold both the third fuel pipe FP3 and first fuel pipe FP1.

To describe the configuration for holding the second fuel pipe FP2 as an example, an interval W between the side holding portions (ribs 403, 404) is formed to be smaller than the diameter of the second fuel pipe FP2 (for example, diameter D of the second fuel pipe FP2 in FIG. 10) (W<D). When the second fuel pipe FP2 is pushed into the side holding portions (ribs 403, 404), the second fuel pipe FP2 is fitted and held in the interval W between the side holding portions (ribs 403, 404) in a state where being pressed by a difference (D−W) between the diameter D of the second fuel pipe FP2 and the interval W between the side holding portions (ribs 403, 404).

The outer peripheral holding portions 411 to 413 have substantially the same curvature as the outer peripheral surface of each fuel pipe (FP1, FP2, FP3), and, in a state of being held by the side holding portion (rib 401 to 404), the outer peripheral surface of each fuel pipe (FP1, FP2, FP3) abuts on the outer peripheral holding portions 411 to 413 and is held in a state of being separated from the shielding wall.

In the configuration of the holding portion HD, as illustrated in FIG. 4, in addition to the configuration in which the fuel pipes (FP1, FP2, FP3) are held in a state of being aligned, the holding portion HD can be provided on the shielding wall so as to hold the three fuel pipes at different positions according to the routing structure considering the curvature angle of each fuel pipe. In addition, the interval W between the side holding portions can be formed in accordance with the diameter of the fuel pipe as a target to be held.

Since the second fuel pipe FP2 is separated from the cylinder portion and shielded from heat by the shielding wall, it is possible to reduce the heat transferred from the cylinder portion to the second fuel pipe FP2.

In addition, since each fuel pipe is held by the holding portion HD, the positions of the plurality of fuel pipes (FP1, FP2, FP3) with respect to the front-and-rear direction, the vertical direction, and the lateral direction (direction perpendicular to the sheet plane) of the internal combustion engine E are regulated in a state of being separated from the shielding wall. That is, it is possible to further suppress heat reception due to heat conduction due to contact with the shielding wall, and it is possible to prevent positional displacement of the fuel pipe due to vibration of the internal combustion engine E.

In addition, since it is possible to position the plurality of fuel pipes (FP1, FP2, FP3) by the holding portion HD, it is possible to suppress interference between the plurality of fuel pipes provided outside the shielding wall and other members and route the fuel pipes easily and compactly.

Note that, in the example of FIG. 4, the configuration in which the holding portion HD is integrally provided on the left lower shroud 11 among the members constituting the shielding wall (10, 11, 12) is exemplarily illustrated, but the present invention is not limited to this example. For example, in a case where the operation unit 19, the control device ECU, and the starting device ST are arranged on the left side surface side in the front view of the internal combustion engine E, the second fuel pump HP2 is arranged on the right side surface side in the front view of the internal combustion engine E, that is, in a space formed below the cylinder portion (second cylinder CL2) of the V-type engine and on the side of the crankcase 11 of the V-type engine. In this case, it is possible to provide the holding portion HD integrally on the right lower shroud 12 among the members constituting the shielding wall (10, 11, 12). In addition, not limited to the left lower shroud 11 and the right lower shroud 12, it is possible to provide the holding portion HD integrally on a part of the front shroud 10.

Holding Position of Second Fuel Pipe FP2 and Arrangement Position of Second Fuel Pump HP2

Figure 9:
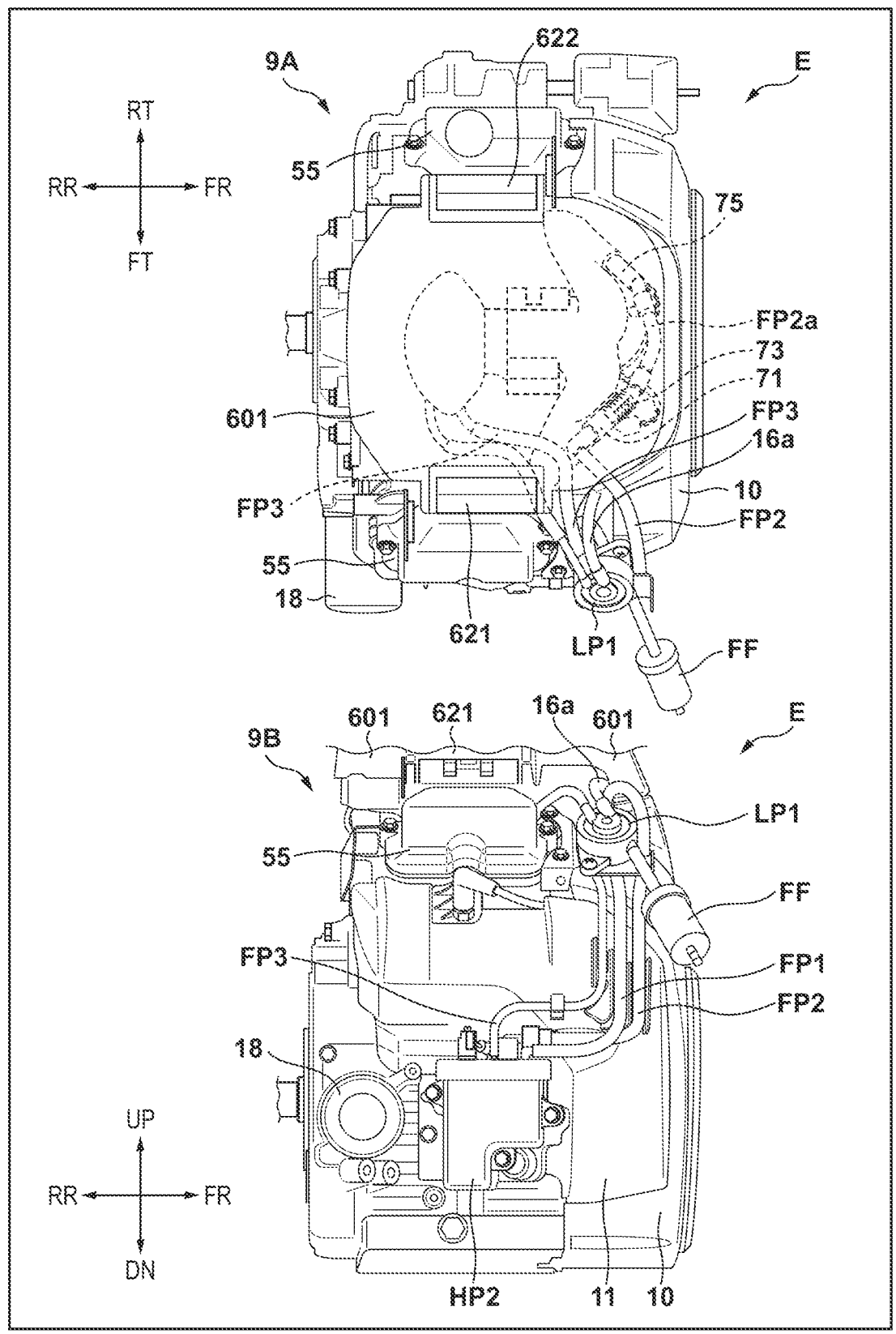
FIG. 9 is a diagram illustrating a routing structure of a high-pressure fuel pipe.

FIG. 9 is a diagram illustrating an appearance of a routing structure of a plurality of fuel pipes (first fuel pipe FP1, second fuel pipe FP2, and third fuel pipe FP3). In a top view of the internal combustion engine E, diagram 9A indicates a routing structure in which the air cleaner cover 601 is considered as transparent using a broken line, and diagram 9B indicates a left side view of the internal combustion engine E.

As described with reference to FIG. 10, the second fuel pipe FP2 has a multiple-pipe structure, and the inner tubular member 110 (elastic coefficient E2) formed of a hard material (E2>E1) that is less likely to be deformed than the outer tubular member 111 (elastic coefficient E1), so that it is difficult to mold a small curvature angle (small R). Therefore, in the routing structure of the second fuel pipe FP2, it is preferable to dispose the pipe such that the curvature angle is as large as possible. Furthermore, from the viewpoint of reducing the pressure feeding resistance of the fuel in the second fuel pipe FP2, the second fuel pipe FP2 in the routing structure is preferably disposed at an angle (obtuse angle) at which the curvature angle θ is as large as possible.

As illustrated in FIGS. 2, 4, and 5, the second fuel pump HP2 (high-pressure fuel pump) is arranged outside the shielding wall and in a space formed between the cylinder portion (first cylinder CL1) of the V-type engine and the crankcase 51 of the V-type engine in the front view. That is, the second fuel pump HP2 (high-pressure fuel pump) is arranged outside the shielding wall, below the cylinder portion (first cylinder CL1) of the V-type engine, and in a space formed on the side of the crankcase 51 of the V-type engine. When viewed from the left side view, the second fuel pump HP2 is arranged outside the shielding wall, below the first cylinder CL1, and is arranged at a position in front of the oil cartridge and behind the left lower shroud 11.

This arrangement position (hereinafter, also referred to as a "space-saving position" (surplus space)) effectively uses the empty region below the first cylinder CL1 in the internal combustion engine E. By arranging the second fuel pump HP2 at this space-saving position, it is possible to make the configuration of the internal combustion engine E compact.

In the routing structure of the second fuel pipe FP2 connected to the second fuel pump HP2 arranged at the space-saving position, the second fuel pipe FP2 is routed to the outermost side (the front side in the left side perspective view of FIG. 2) among the plurality of fuel pipes (first fuel pipe FP1, second fuel pipe FP2, and third fuel pipe FP3) so as to have a curvature angle as large as possible (FIG. 9) and is held by the holding portion HD (positions of rib 403 and rib 404 in holding portion HD in FIG. 4). Among the plurality of fuel pipes (the first fuel pipe FP1, second fuel pipe FP2, and third fuel pipe FP3) held by the holding portion HD, the second fuel pipe FP2 is connected to the second fuel pump HP2 (high-pressure fuel pump) at the largest curvature angle.

According to such a routing structure of the second fuel pump HP2 and the second fuel pipe FP2, it is possible to route the curvature angle of the second fuel pipe FP2 at a curvature angle (obtuse angle) as large as possible while making the configuration of the internal combustion engine E compact. This makes it possible to reduce the pressure feeding resistance of the fuel in the second fuel pipe FP2 while solving the problem that it is difficult to mold a small curvature angle (small R) in the second fuel pipe FP2 having the multiple-pipe structure (FIG. 10).

Attachment Structure of Air Cleaner

Figure 6:
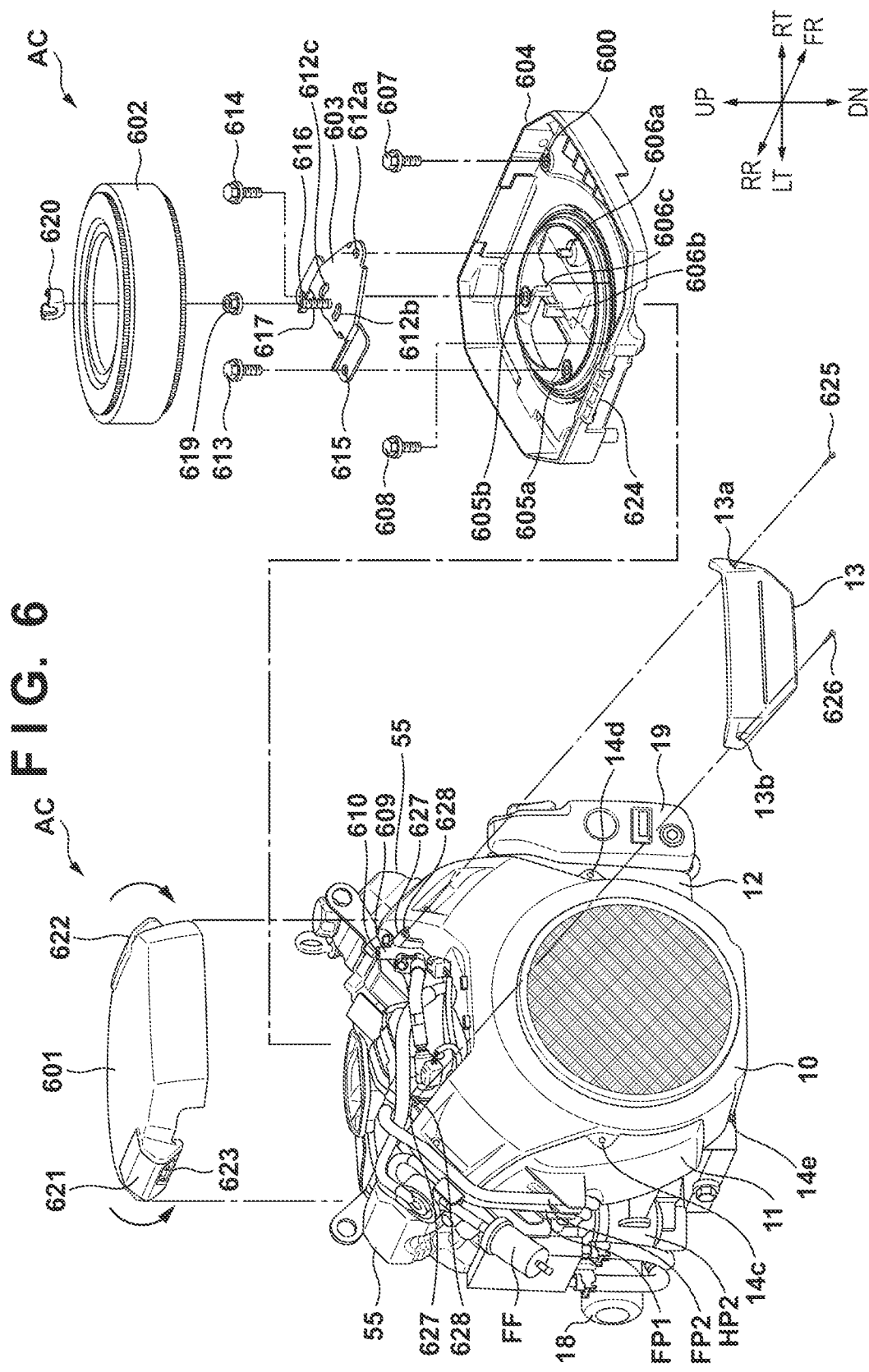
FIG. 6 is a diagram for explaining an attachment structure of an air cleaner.

FIG. 6 is a diagram for explaining an attachment structure of the air cleaner. As illustrated in FIG. 6, the air cleaner AC includes an air cleaner cover 601, an air cleaner element 602, an element holding portion 603, and an element case 604.

The element case 604 is provided with screw engagement portions 605a and 605b (screw holes) for attaching the element holding portion 603 member, and positioning pins 606a, 606b, and 606c for positioning the element holding portion 603, and through holes 600 through which fastening members 607 and 608 (for example, bolts) pass. In FIG. 6, of the two fastening members 607 and 608, a through hole corresponding to the fastening member 608 is not illustrated. The element case 604 is attached to the upper portion of the internal combustion engine E as the fastening members 607 and 606 (for example, bolts) engage with a screw engagement portion 610 (screw hole) formed in a boss 609 in the upper portion of the internal combustion engine E. In FIG. 6, of the two fastening members 607 and 608, a screw engagement portion (screw hole) corresponding to the fastening member 608 is not illustrated.

The element holding portion 603 is provided with positioning holes 612a, 612b, and 612c, through holes 615 and 616 through which fastening members 613 and 614 (for example, bolts) pass, and a stud bolt 617. The element holding portion 603 is positioned by inserting the positioning holes 612a, 612b, and 612c into the positioning pins 606a, 606b, and 606c of the element case 604, and the element holding portion 603 is attached in a state of being positioned at a predetermined position of the element case 604 as the fastening members 613 and 614 pass through the through holes 615 and 616 and engage with the screw engagement portions 605a and 605b (screw holes) of the element case 604.

By inserting a spacer collar 619 and the air cleaner element 602 into the stud bolt 617 and causing the fastening member 620 (for example, a butterfly screw) to engage with the stud bolt 617, the air cleaner element 602 is attached to the element case 604 in the upper portion of the internal combustion engine E via the element holding portion 603.

The air cleaner cover 601 is provided with handle knobs 621 and 622 biased in the arrow direction by a spring (not illustrated in the drawings) on the end portion side in the lateral direction. In a state that the handle knobs 621 and 622 opened in the direction opposite to the arrow direction, when the air cleaner cover 601 is placed above the element case 604 and the handle knobs 621 and 622 are closed in the arrow direction, a recess 623 formed inside the handle nobs 621 and 622 engage with a projection 624 provided on the element case 604 so that the air cleaner cover 601 is attached above the element case 604. Note that, in FIG. 6, a recess formed inside the handle knob 622 and a projection of the element case 604 that engages with the recess are not illustrated, but the same configuration as the recess 623 of the handle knob 621 and the projection 624 of the element case 604 is provided.

As fastening members 625, 626 (for example, a screw) pass through through holes 13a, 13b of the upper shroud 13 and engage with screw engagement portions 628 (screw holes) formed in bosses 627 of the front shroud 10, the upper shroud 13 is attached to the upper portion of the front shroud 10.

Branch Structure of Second Fuel Pipe FP2 (High-Pressure Fuel Pipe)

Figure 7:
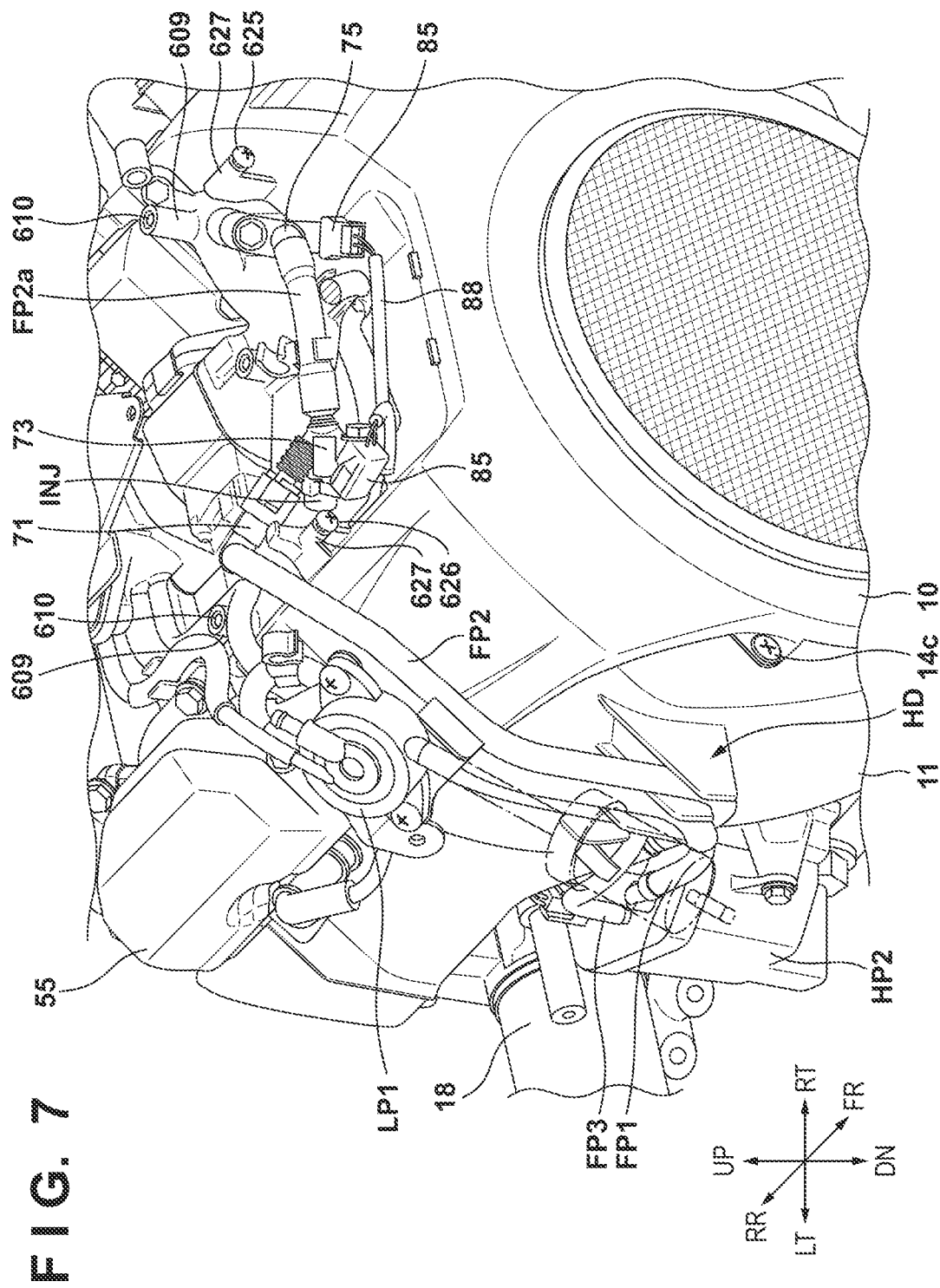
FIG. 7 is a diagram for explaining a branch structure of a second fuel pipe (high-pressure fuel pipe).
Figure 8:
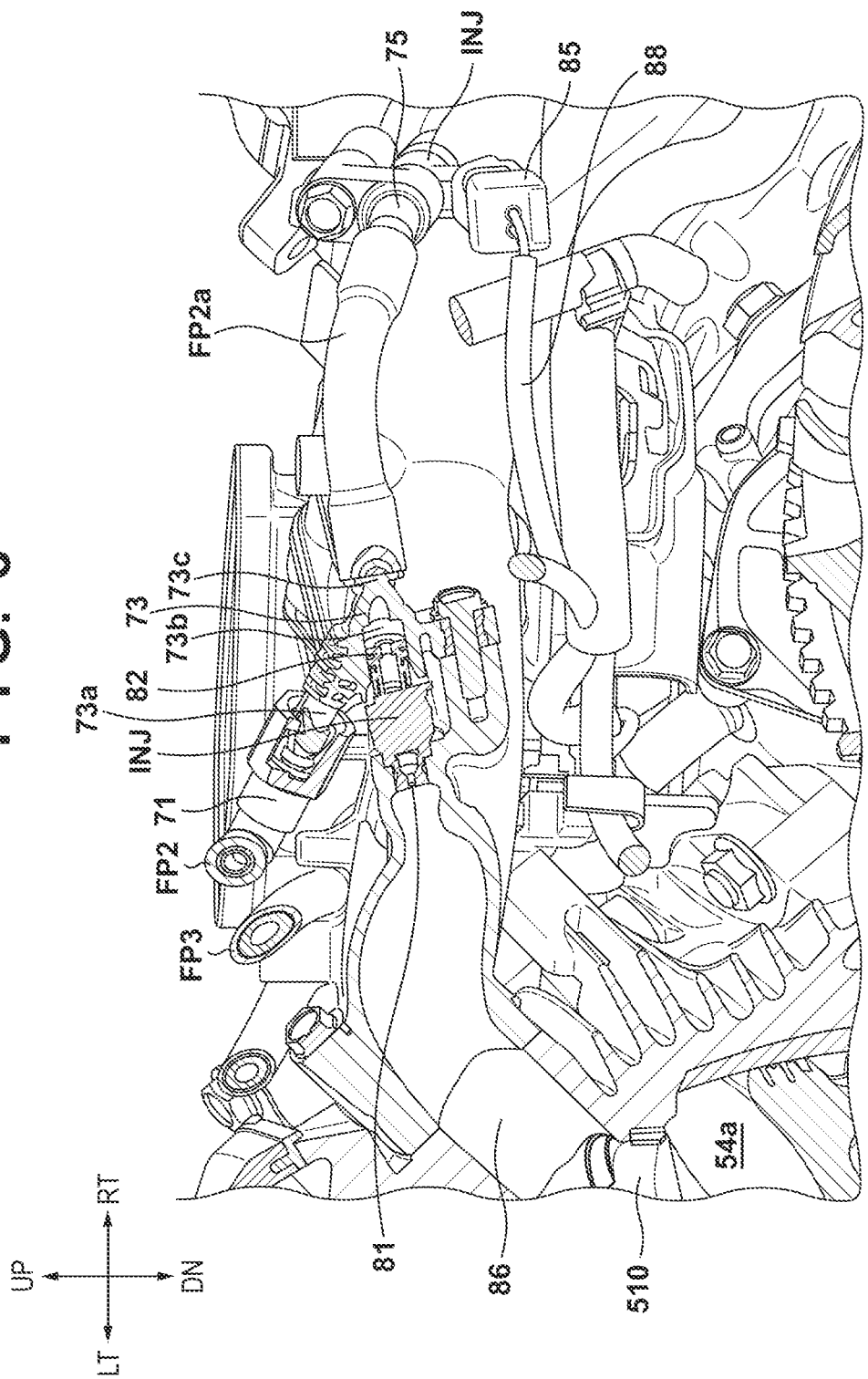
FIG. 8 is a diagram for explaining an arrangement structure of a fuel injection device.

FIG. 7 is a diagram for explaining a branch structure of the second fuel pipe FP2 (high-pressure fuel pipe), and FIG. 8 is a diagram for explaining an arrangement structure of the fuel injection device INJ connected to the branched second fuel pipe FP2.

FIG. 7 illustrates a state in which the air cleaner cover 601, the air cleaner element 602, the element holding portion 603, the element case 604, and the diaphragm tube 16a described in FIG. 6 are removed from the state of the internal combustion engine E illustrated in FIG. 1.

The second fuel pipe FP2 (high-pressure fuel pipe) extending from the second fuel pump HP2 (high-pressure fuel pump) side is connected to a branch member 73 (FIGS. 7 and 8) via a joint 71. The branch member 73 is a member having a trifurcated structure including two output ports 73b and 73c for one input port 73a, and the one input port 73a is connected to the second fuel pipe FP2 (high-pressure fuel pipe) via the joint 71. One output port 73b of the two output ports 73b and 73c is connected to the fuel injection device INJ (first cylinder CL1 side) illustrated in FIG. 8. Of the two output ports 73b and 73c, the other output port 73c is connected to the fuel injection device INJ on the second cylinder CL2 side via an extension FP2a of the second fuel pipe FP2. Although the arrangement structure of the fuel injection device INJ on the second cylinder CL2 side is not illustrated in the drawings, as illustrated in FIG. 8, the fuel injection device INJ on the second cylinder CL2 side is also attached to the internal combustion engine E with a similar arrangement structure as the fuel injection device INJ on the first cylinder CL1 side. In the following description, an arrangement structure of the fuel injection device INJ on the first cylinder CL1 side will be described with reference to FIG. 8.

The fuel injection device INJ is arranged above the internal combustion engine E. In order to prevent fuel clogging due to the accumulation of fuel in the fuel injection device INJ, an injection hole 81 formed at the end portion of the fuel injection device INJ is provided to be directed downward (downward in the gravity direction) toward the combustion chamber 54a, and a connection portion 82 connected to the second fuel pipe FP2 via the branch member 73 and the joint 71 is provided at the other end portion of the fuel injection device INJ. The connection portion 82 is provided to be directed upward (upward in the gravity direction) with respect to the injection hole 81, and the holding portion HD holds the second fuel pipe FP2 toward the connection portion 82.

The fuel injection device INJ is connected to a cable 88 and a connector 85 that supply power and transmit a control signal, and the operation of fuel injection is controlled based on the power supplied from the control device ECU and the control signal. The fuel injected from the injection hole 81 of the fuel injection device INJ is introduced into the combustion chamber 54a via a fuel supply path 86.

It is possible to prevent the fuel clogging by directing the injection hole 81 formed at the end portion of the fuel injection device INJ downward toward the combustion chamber 54a, and by providing, outside the shielding wall, the second fuel pipe FP2 connected to the connection portion 82 provided at the other end portion, it is possible to make the curvature angle of the second fuel pipe FP2 gentle and lower the fuel supply resistance. In addition, since it is possible to guide the routing position of the second fuel pipe FP2 by the holding portion HD, it is possible to easily and compactly perform routing while maintaining the curvature angle without being affected by vibration from the internal combustion engine E.

Second Embodiment

Figure 11:
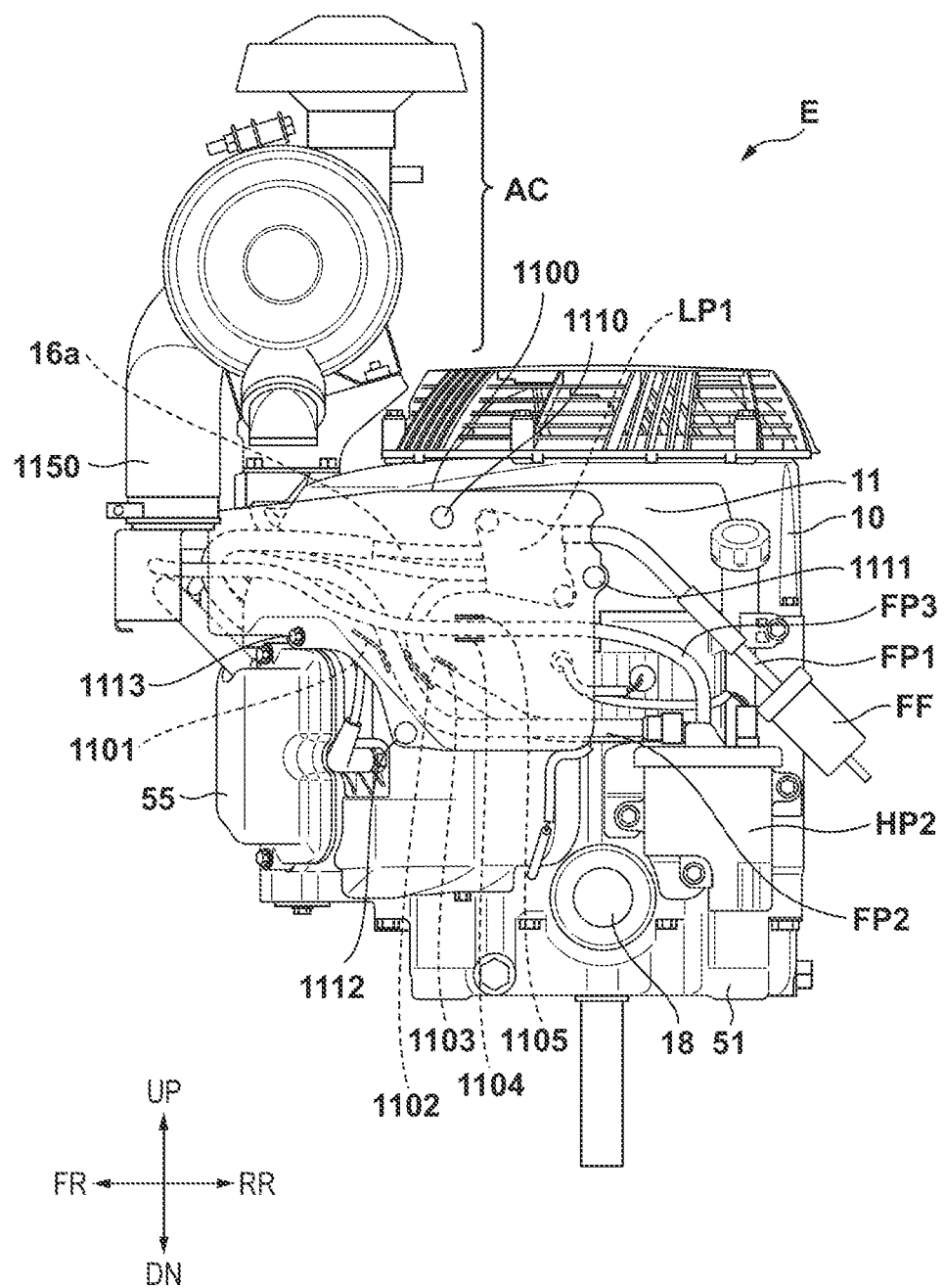
FIG. 11 is a left side view of an internal combustion engine according to a second embodiment.
Figure 12:
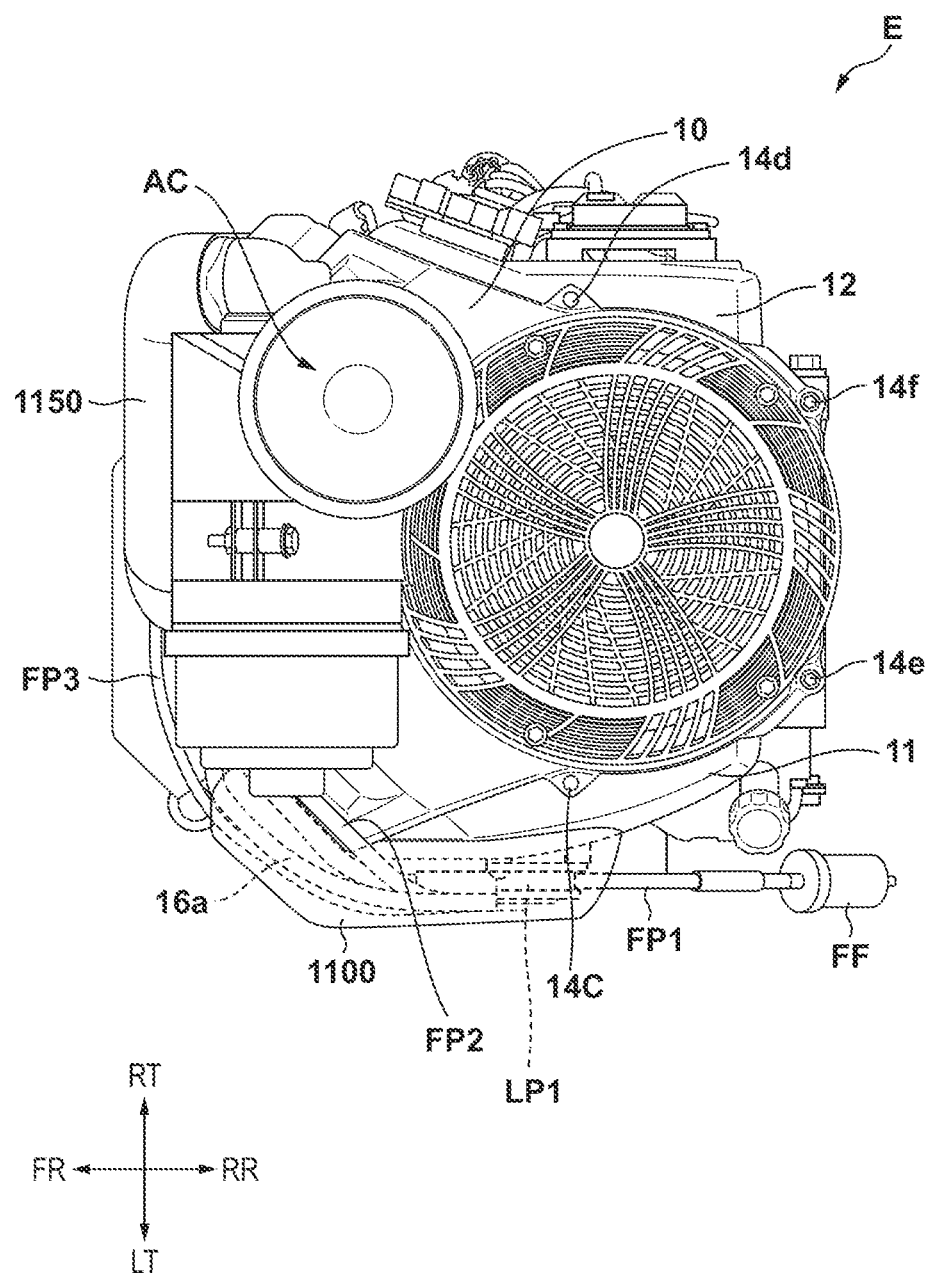
FIG. 12 is a top view of the internal combustion engine according to the second embodiment.
Figure 13:
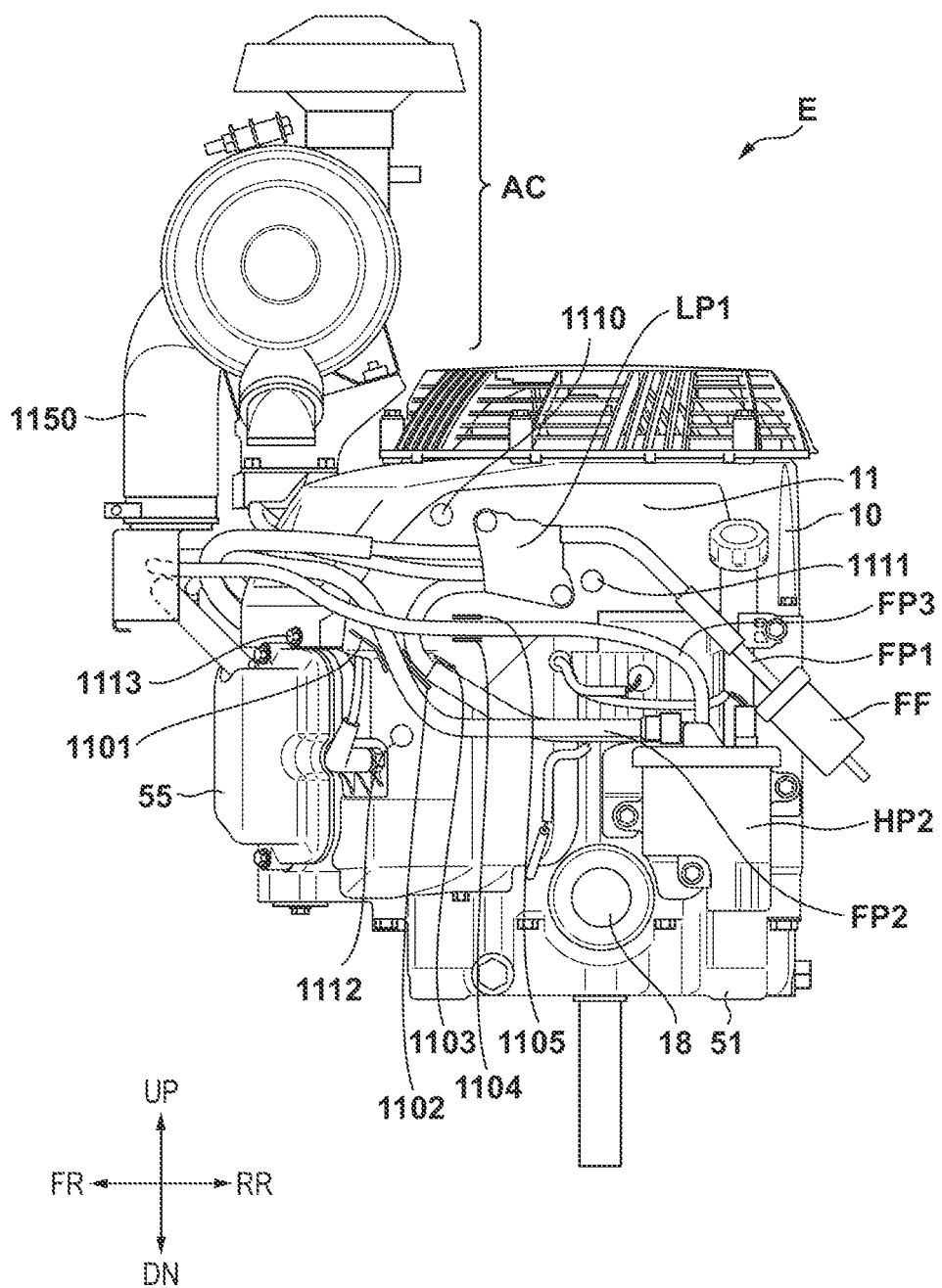
FIG. 13 is a diagram illustrating a state in which an exterior cover is removed from the internal combustion engine illustrated in FIG. 11.
Figure 14:
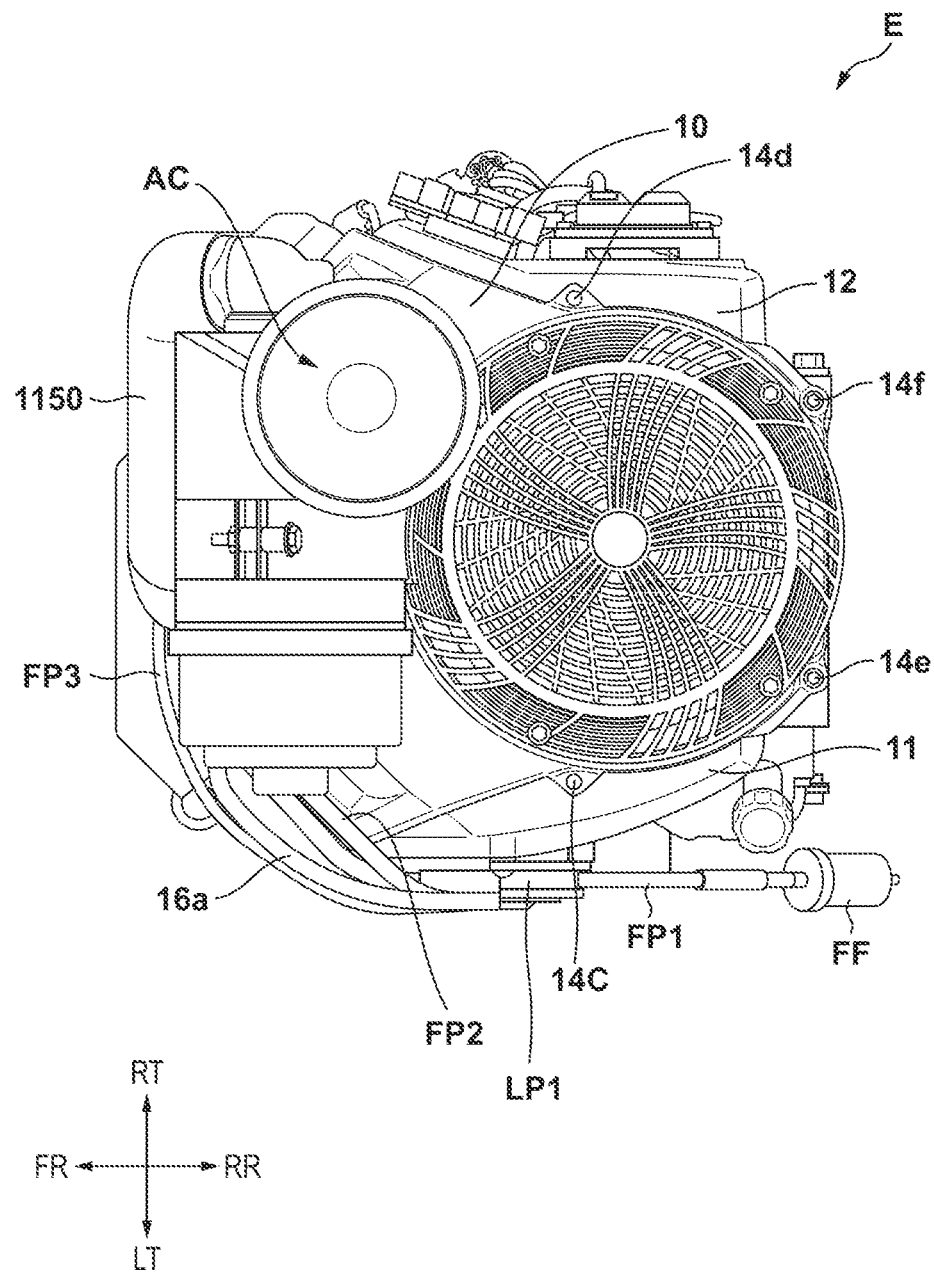
FIG. 14 is a diagram illustrating a state in which the exterior cover is removed from the internal combustion engine illustrated in FIG. 12.

FIG. 11 is a left side view of an internal combustion engine E according to the second embodiment, and FIG. 12 is a top view of the internal combustion engine. FIG. 13 is a diagram illustrating a state in which an exterior cover 1100 is removed from the internal combustion engine E illustrated in FIG. 11, and FIG. 14 is a diagram illustrating a state in which the exterior cover 1100 is removed from the internal combustion engine E illustrated in FIG. 12. In addition, as directions in the drawings used for the following description, arrow FR indicating the front and arrow RR indicating the rear of the internal combustion engine, arrow LT indicating the left direction and arrow RT indicating the right direction of the internal combustion engine, and arrow UP indicating the upper side and arrow DN indicating the lower side of the internal combustion engine are illustrated.

The configuration of the internal combustion engine E is basically the same as the configuration described in the first embodiment, the internal combustion engine E is an engine (V-type engine) in which a plurality of cylinders (CL1, CL2) is arranged in a substantially V-shape as described with reference to FIG. 5, and the second fuel pump HP2 is arranged outside the shielding wall and in a space formed between the cylinder portion of the V-type engine (first cylinder CL1 (FIG. 5)) and the crankcase 51 of the V-type engine. That is, the second fuel pump HP2 is arranged outside the shielding wall, behind the cylinder portion of the V-type engine (RR direction in FIGS. 11 and 13), and in a space firmed on the side of the crankcase 51 of the V-type engine (direction perpendicular to the sheet planes in FIGS. 11 and 13).

In addition, the structure of the shielding wall is similar to the structure described in the first embodiment, and the first fuel pipe FP1 interconnects the fuel filter FF, the first fuel pump LP1 (low-pressure fuel pump), and the second fuel pump HP2 (high-pressure fuel pump) set to have a pressure higher than the pressure of the first fuel pump LP1. In addition, the second fuel pipe FP2 connects the second fuel pump HP2 to the fuel injection device INJ that injects fuel into the combustion chamber formed in a cylinder portion of the internal combustion engine.

The air cleaner AC provided being a separate body and the internal combustion engine E are connected by an air supply pipe 1150. In addition, the third fuel pipe FP3 connects the second fuel pump HP2 (high-pressure fuel pump) to an air cleaner AC being a provided separate body.

As described in the first embodiment, in the internal combustion engine E, the shielding wall is provided with a holding portion HD that holds at least the first fuel pipe FP1 (low-pressure fuel pipe) and the second fuel pipe FP2 (high-pressure fuel pipe). The shielding wall is an engine cover that covers at least the cylinder portion (CL1, CL2), and the holding portion is provided integrally with the engine cover. The holding portion HD includes a plurality of ribs 1101, 1102, 1103, 1104, and 1105 protruding outward the shielding wall. Among the plurality of ribs 1101 to 1105, the rib 1101 and the rib 1102 serve as a pair of side support portions and hold the second fuel pipe FP2. In addition, the rib 1102 and the rib 1103 serve as a pair of side support portions and hold the first fuel pipe FP1. The rib 1104 and the rib 1105 serve as a pair of side support portions and hold the third fuel pipe FP3. At least one or more ribs (rib 1103) of the plurality of ribs 1101 to 1105 hold both the first fuel pipe FP1 (low-pressure fuel pipe) and the second fuel pipe FP2 (high-pressure fuel pipe).

The internal combustion engine E further includes an exterior cover 1100 provided outside the shielding wall. The exterior cover 1100 is attached to the shielding wall by fastening members 1110, 1111, and 1112 such as screws or the like. In addition, the exterior cover 1100 and the shielding wall are attached to the cylinder block 53 by being fastened with a fastening member 1113 such as a bolt or the like. The exterior cover 1100 covers at least a part of the second fuel pipe FP2 provided outside the shielding wall.

By covering the second fuel pipe exposed from the shielding wall with the exterior cover, it is possible to route the second fuel pipe reliably around the internal combustion engine E, it is possible to make the routing of the second fuel pipe compact, and it is possible to suppress an influence due to an external factor applied to the second fuel pipe.

Summary of Embodiments

Configuration 1: An internal combustion engine (for example, E in FIGS. 1 to 5 and 11 to 14) of the above embodiment is an internal combustion engine (E) including a first fuel pump (for example, LP1 in FIGS. 1 to 3 and 11 to 14) that sucks fuel through a fuel filter (for example, FF in FIGS. 1 to 4 and 11 to 14) and a second fuel pump (for example, HP2 in FIGS. 1 to 4 and 11 to 14) that supplies the fuel to a fuel injection device (for example, INJ in FIGS. 7 and 8), and the internal combustion engine includes:

a first fuel pipe (for example, FP1 in FIGS. 1 to 4 and 11 to 14) that interconnects the fuel filter (FF), the first fuel pump (LP1), and the second fuel pump (HP2) set to have a pressure higher than a pressure of the first fuel pump (LP1); and a second fuel pipe (for example, FP2 in FIGS. 1 to 3, 7, 8, and 11 to 14) that connects the second fuel pump (HP2) to the fuel injection device (INJ) that injects fuel into a combustion chamber (for example, 54a in FIG. 5) formed in a cylinder portion (for example, CL1 and CL2 in FIG. 5) of the internal combustion engine, a shielding wall (for example, 10, 11, and 12 in FIGS. 1 to 4, 6, and 11 to 14) covering an outside of the cylinder portion is provided between at least a part of the second fuel pipe (FP2) and the cylinder portion (CL1, CL2), and the shielding wall (10, 11, 12) includes a holding portion (for example, HD (401 to 404) in FIGS. 1 and 4, and 1101 to 1105 in FIGS. 11 to 14) that holds at least the first fuel pipe (FP1) and the second fuel pipe (FP2).

According to the internal combustion engine of Configuration 1, since the second fuel pipe is separated from the cylinder portion and shielded from heat by the shielding wall, it is possible to reduce the heat transferred from the cylinder portion to the second fuel pipe. Accordingly, it is possible to provide an internal combustion engine capable of reducing fuel vaporization and suppressing the occurrence of vapor lock.

In addition, since it is possible to position the plurality of fuel pipes by the holding portion, it is possible to suppress interference between the plurality of fuel pipes provided outside the shielding wall and other members and route the fuel pipes easily and compactly.

Configuration 2: In the internal combustion engine (E) of the above embodiment, the fuel injection device (INJ) is arranged above the internal combustion engine (E), an injection hole (for example, 81 in FIG. 8) formed at an end portion of the fuel injection device (INJ) is provided to be directed downward toward the combustion chamber (54a), and a connection portion (for example, 82 in FIG. 8) with the second fuel pipe is provided at another end portion of the fuel injection device (INJ), and the holding portion (HD (401 to 404), 1101 to 1105) holds the second fuel pipe (FP2) toward the connection portion (82).

According to the internal combustion engine of Configuration 2, the injection hole formed at the end portion of the fuel injection device is directed downward toward the combustion chamber to prevent the fuel clogging, and the second fuel pipe connected to the connection portion provided at the other end portion is provided outside the shielding wall, so that the curvature angle of the second fuel pipe is uncle gentle to lower the fuel supply resistance, and the routing position can be guided by the holding portion. Therefore, it is possible to easily and compactly perform routing while maintaining the curvature angle without being affected by vibration from the internal combustion engine.

Configuration 3: In the internal combustion engine (E) of the above embodiment, the shielding wall (10, 11, 12) is an engine cover that covers at least the cylinder portion (CL1, CL2), and the holding portion (HD (401 to 404), 1101 to 1105) is provided integrally with the engine cover.

According to the internal combustion engine of Configuration 3, since the holding portion is integrally molded with the engine cover, it is possible to configure the internal combustion engine simply without increasing the number of parts.

Configuration 4: In the internal combustion engine of the above embodiment, the holding portion (HD (401 to 404), 1101 to 1105) includes a plurality of ribs (for example, 401, 402, 403, and 404 in FIG. 4, and 1101, 1102, 1103, 1104, and 1105 in FIGS. 11 and 13) protruding outward the shielding wall, and at least one or more ribs of the plurality of ribs (for example, 403 in FIG. 4, and 1102 in FIGS. 11 and 13) hold both the first fuel pipe (FP1) and the second fuel pipe (FP2).

When each fuel pipe is held by a dedicated rib, two times as many ribs as the number of fuel pipes are required (four ribs are required when the number of fuel pipes is two). However, according to the internal combustion engine of Configuration 4, a plurality of fuel pipes, for example, two fuel pipes can be held by three ribs, it is possible to reduce the number of ribs, and it is possible to make the two fuel pipes directed toward the same second fuel pump HP2 (high-pressure fuel pump).

Configuration 5: In the internal combustion engine (E) of the above embodiment, the plurality of ribs constituting the holding portion (HD, 1101 to 1105) includes a side holding portion (for example, ribs 402, 403, 404 of FIG. 4) that holds sides of the first fuel pipe (FP1) and the second fuel pipe (FP2), and an outer peripheral holding portion (for example, 412 and 413 in FIG. 4) that holds outer peripheral surfaces of the first fuel pipe (FP1) and the second fuel pipe (FP2) in a state of being separated from the shielding wall.

According to the internal combustion engine of the configuration 5, since each fuel pipe is held by the holding portion, the position of each fuel pipe with respect to the front-and-rear direction, the vertical direction, and the lateral direction (direction perpendicular to the sheet plane) of the internal combustion engine E is regulated in a state of being separated from the shielding wall. This makes it possible to prevent positional displacement of the fuel pipe due to vibration of the internal combustion engine E. In addition, since it is possible to further reduce heat reception due to heat conduction due to contact with the shielding wall, it is possible to further suppress the generation of air bubbles (vapor) due to fuel vaporization.

Configuration 6: The internal combustion engine (E) according to the above embodiment is a V-type engine in which a plurality of cylinder portions (CL1, CL2) is arranged in a substantially V-shape in the front view, and the second fuel pump (HP2) is arranged outside the shielding wall (10, 11, 12) and in a space formed between a cylinder portion (CL1) of the V-type engine and a crankcase (51) of the V-type engine.

According to the internal combustion engine of Configuration 6, by providing the high-pressure fuel pump in the surplus space formed outside the V-type engine, it is possible to downsize the internal combustion engine, and it is possible to protect the second fuel pump HP2 (high-pressure fuel pump) by the V-type engine main body.

Configuration 7: In the internal combustion engine (E) of the above embodiment, the holding portion (HD) includes a plurality of ribs (401, 402, 403, 404, 1101, 1102, 1103, 1104, 1105) protruding outward the shielding wall (10, 11, 12), and the plurality of ribs includes an outer peripheral holding portion that holds outer peripheral surfaces of the first fuel pipe (FP1) and the second fuel pipe (FP2) in a state of being separated from the shielding wall, and the outer peripheral holding portion is provided to be directed toward a side of the second fuel pump.

According to the internal combustion engine of Configuration 7, for example, even when the first fuel pipe or the like is made of a hard material in order to withstand stress from an external factor, it is possible to provide a routing structure that guides the fuel pipe toward the second fuel pump and facilitates positioning.

Configuration 8: In the internal combustion engine (E) according to the above embodiment, the holding portion (HD) includes a plurality of ribs (401, 402, 403, 404, 1101, 1102, 1103, 1104, 1105) protruding outward the shielding wall (10, 11, 12), and the second fuel pipe is held by a rib (403 and 404 in FIGS. 1 and 2, and 1101 and 1102 in FIGS. 11 and 13) arranged farthest from the second fuel pump among the plurality of ribs.

According to the internal combustion engine of Configuration 8, among the plurality of fuel pipes held by the holding portion HD, the second fuel pipe is connected to the second fuel pump HP2 at the largest curvature angle (for example, an obtuse angle of approximately 180°). According to such a routing structure of the second fuel pump HP2 and the second fuel pipe FP2, it is possible to route the curvature angle of the second fuel pipe FP2 at a curvature angle (obtuse angle) as large as possible while making the configuration of the internal combustion engine E compact. This makes it possible to reduce the pressure feeding resistance of the fuel in the second fuel pipe FP2 while solving the problem that it is difficult to mold a small curvature angle (small R) the second fuel pipe FP2 having the multiple-pipe structure.

Configuration 9: In the internal combustion engine of the above embodiment, the second fuel pipe (FP2) has a multiple-pipe structure including at least an inner tubular member (for example, 110 in FIG. 10) and an outer tubular member (for example, 111 in FIG. 10) covering an outer side of the inner tubular member (110) and the outer tubular member (111) is formed of a member that an elastic coefficient (E1) of the outer tubular member (111) is smaller than an elastic coefficient (E2) of the inner tubular member (110) (E2>E1).

According to the internal combustion engine of Configuration 9, it is possible to enhance the strength and durability of the second fuel pipe, and it is possible to suppress an influence associated with an external factor.

Configuration 10: In the internal combustion engine of the above embodiment, the internal combustion engine further includes an exterior cover (for example, 1100 in FIGS. 11 and 12) provided outside the shielding wall, and the exterior cover (1100) covers at least a part of the second fuel pipe (FP2) provided outside the shielding wall (10, 11, 12).

According to the internal combustion engine of Configuration 10, by covering the second fuel pipe exposed from the shielding wall with the exterior cover, it is possible to route the second fuel pipe reliably around the internal combustion engine E, it is possible to make the routing of the second fuel pipe compact, and it is possible to suppress an influence (for example, damage) due to an external factor applied to the second fuel pipe.

The present invention is not limited to the above embodiments and various changes and modifications can be made within the spirit and scope of the present invention. Therefore, to apprise the public of the scope of the present invention, the following claims are made.

What is claimed is:

1. An internal combustion engine that includes a first fuel pump that sucks a fuel through a fuel filter, and a second fuel pump that then supplies the fuel to a fuel injection device that injects the fuel into a combustion chamber formed in a cylinder portion of the internal combustion engine, the internal combustion engine comprising:
    a first fuel pipe that interconnects the fuel filter, the first fuel pump, and the second fuel pump; and
    a second fuel pipe that connects the second fuel pump to the fuel injection device,
    wherein a shielding wall covering an exterior of the cylinder portion is provided between at least a part of the second fuel pipe and the cylinder portion, and
    the shielding wall includes a holding portion that holds at least the first fuel pipe and the second fuel pipe.

2. The internal combustion engine according to claim 1, wherein
    the fuel injection device is arranged above the internal combustion engine,
    an injection hole formed at a first end portion of the fuel injection device is directed downward toward the combustion chamber,
    a connection portion connected to the second fuel pipe is provided at a second end portion of the fuel injection device, and
    the holding portion holds the second fuel pipe toward the connection portion.

3. The internal combustion engine according to claim 1, wherein the shielding wall is an engine cover that covers at least the cylinder portion, and the holding portion is provided integrally with the engine cover.

4. The internal combustion engine according to claim 1, wherein the holding portion includes a plurality of ribs protruding outward from the shielding wall, and the plurality of ribs hold the first fuel pipe and the second fuel pipe.

5. The internal combustion engine according to claim 4, wherein
    the plurality of ribs of the holding portion includes:

a side holding portion that holds sides of the first fuel pipe and the second fuel pipe; and an outer peripheral holding portion that holds outer peripheral surfaces of the first fuel pipe and the second fuel pipe in a state of being separated from the shielding wall.

6. The internal combustion engine according to claim 1, wherein the internal combustion engine is a V-type engine in which a plurality of cylinder portions is arranged in a substantially V-shape in a front view of the V-type engine, and the second fuel pump is arranged outside the shielding wall and in a space formed between at least one cylinder portion of the plurality of cylinder portions and a crankcase of the V-type engine.

7. The internal combustion engine according to claim 6, wherein the holding portion includes a plurality of ribs protruding outward from the shielding wall, the plurality of ribs includes an outer peripheral holding portion that holds outer peripheral surfaces of the first fuel pipe and the second fuel pipe in a state of being separated from the shielding wall, and the outer peripheral holding portion is directed toward a side of the second fuel pump.

8. The internal combustion engine according to claim 6, wherein the holding portion includes a plurality of ribs protruding outward from the shielding wall, the second fuel pipe is held by a rib of the plurality of ribs arranged farthest from the second fuel pump with respect to other ribs of the plurality of ribs.

9. The internal combustion engine according to claim 1, wherein the second fuel pipe has a multiple-pipe structure including at least an inner tubular member and an outer tubular member covering an exterior of the inner tubular member, and the outer tubular member is formed such that an elastic coefficient of the outer tubular member is smaller than an elastic coefficient of the inner tubular member.

10. The internal combustion engine according to claim 1, wherein the internal combustion engine further includes an exterior cover provided outside the shielding wall, and the exterior cover covers at least the part of the second fuel pipe.

\* \* \* \* \*